(12) United States Patent
Logsdon et al.

(10) Patent No.: US 6,201,325 B1
(45) Date of Patent: Mar. 13, 2001

(54) CENTRIFUGAL ACTUATOR FOR CONTROLLING A SWITCH UNIT PARTICULARLY A START WINDING SWITCH UNIT FOR AN ELECTRIC MOTOR

(75) Inventors: Michael A. Logsdon; Duane R. Nolte, both of Wausau, WI (US)

(73) Assignee: Marathon Electric Manufacturing Corportion, Wausau, WI (US)

( * ) Notice: Subject to any disclaimer, the term of this patent is extended or adjusted under 35 U.S.C. 154(b) by 0 days.

(21) Appl. No.: 09/526,355

(22) Filed: Mar. 16, 2000

(51) Int. Cl.[7] ................................................... H02K 11/00
(52) U.S. Cl. ....................................... 310/68 E; 200/80 R
(58) Field of Search ............................. 310/68 E, 68 R; 200/80 R; 318/793

(56) References Cited

U.S. PATENT DOCUMENTS

| | | | |
|---|---|---|---|
| 1,926,339 | 9/1933 | Kindl et al. ........................ | 310/68 E |
| 2,187,207 | 1/1940 | McCabe ............................ | 310/68 E |
| 2,199,232 | 4/1940 | Taylor .............................. | 310/68 E |
| 2,277,425 | 3/1942 | Wiest ............................... | 310/68 E |
| 2,372,064 | 3/1945 | Esarey ............................. | 310/68 E |
| 2,512,405 | 6/1950 | Willits et al. ..................... | 310/68 E |
| 2,538,410 | 1/1951 | Bretch ............................. | 310/68 E |
| 2,608,677 | 8/1952 | Wightman et al. ................ | 310/68 E |
| 2,691,127 | 10/1954 | Oliwa .............................. | 310/68 E |
| 2,747,854 | 5/1956 | Schnepf ........................... | 310/68 E |
| 2,767,274 | 10/1956 | Ritter .............................. | 310/68 E |
| 3,271,602 | 9/1966 | Waters ............................. | 310/68 E |
| 3,381,197 | 4/1968 | Waters et al. .................... | 310/68 E |
| 3,575,562 | 4/1971 | Remke ............................. | 310/68 E |
| 3,609,421 | 9/1971 | Hildebrandt ...................... | 310/68 E |
| 3,691,415 | 9/1972 | Hancock et al. .................. | 310/68 E |
| 3,790,730 | 2/1974 | Wyland ........................... | 310/68 E |
| 3,881,143 | 4/1975 | Fannin et al. .................... | 310/68 E |
| 4,034,173 | 7/1977 | Crow et al. ...................... | 310/68 E |
| 4,205,245 | 5/1980 | Hildebrandt et al. ............. | 310/68 E |
| 4,208,559 | 6/1980 | Gray ............................... | 200/239 |
| 4,224,542 | 9/1980 | Kawano et al. ................... | 310/68 E |
| 4,242,607 | 12/1980 | Hildebrandt et al. ............. | 310/68 E |
| 4,284,864 | 8/1981 | Crow et al. ...................... | 310/68 E |
| 4,289,988 | 9/1981 | Schaefer .......................... | 310/68 E |
| 4,296,366 | 10/1981 | Hildebrandt et al. ............. | 200/80 R |
| 4,315,118 | 2/1982 | Kramer et al. ................... | 200/80 R |
| 4,334,161 | 6/1982 | Carli ............................... | 310/68 E |
| 4,336,472 | 6/1982 | Czech .............................. | 310/68 E |
| 4,377,731 | 3/1983 | Georgelin ........................ | 200/80 R |
| 4,386,290 | * 5/1983 | Monette ........................... | 310/68 E |
| 4,598,185 | 7/1986 | Moore ............................. | 200/80 R |
| 4,614,904 | 9/1986 | Yamazaki et al. ................ | 318/793 |
| 4,661,732 | 4/1987 | Gehrt .............................. | 310/68 E |
| 4,922,066 | 5/1990 | Crow et al. ...................... | 200/80 R |
| 5,153,471 | 10/1992 | Ottersbach ....................... | 310/68 E |
| 5,283,405 | 2/1994 | Nolte et al. ...................... | 200/80 R |
| 5,293,090 | 3/1994 | Heilman et al. .................. | 310/68 E |

* cited by examiner

*Primary Examiner*—Burton Mullins
(74) *Attorney, Agent, or Firm*—Andrus, Sceales, Starke & Sawall (57) ABSTRACT

A centrifugal actuator for operating a motor start winding switch includes a base fixed to the shaft as a bearing shoulder and a hub slidably mounted to the base by a groove mating projection and grooves. The hub has a flange which actuates the switch. The hub and base include stops which limit the hub travel. Diametrically opposite hinge units on the base receive offset pivot arms including a pivot rod held in the unit by weight connected coil springs. The weights are L-shaped having heavy plate and offset levers having a hinge or pivot plate therebetween. The pivot plate is offset from the plane of the levers and includes an opening forming the pivot rod having a coined pivot edge. The base hinge units have hook members within which the rod pivots. The outer tab of the hook enters the pivot plate opening in the run position to lock the weight in place. The base is secured to the shaft with an end surface to function as a shoulder for a bearing. The base is mounted with loaded portions to prevent base creeping or deflection. The base and hub are weight balanced for vertical motors. The pivot rod is located to place the pivot point of the weight at substantially the center of the mass of the weight, giving due consideration to the hub.

18 Claims, 5 Drawing Sheets

FIG. 10

CENTRIFUGAL ACTUATOR FOR CONTROLLING A SWITCH UNIT PARTICULARLY A START WINDING SWITCH UNIT FOR AN ELECTRIC MOTOR

BACKGROUND OF THE PRESENT INVENTION

This invention relates to a centrifugal actuator for controlling a switch unit and particularly a starting switch unit of an electric motor for disconnecting the start winding when the motor reaches a desired speed.

Centrifugal actuators for motor starting and other applications are well known. A particularly satisfactory centrifugal actuator for AC induction motors is disclosed in U.S. Pat. No. 4,386,290 entitled "Centrifugal Actuator For AC Induction Motors" which issued May 31, 1983 and is assigned to the assignee of the present invention. Generally, known centrifugal actuator units have a common construction consisting of oppositely located and spring loaded levers or arms, each having a general U-shaped configuration. The switching levers have a relatively heavy outer weight connected to the arms which project inwardly from a hinge support member on a base and are interconnected to an axially movable hub member which responds to the pivotal movement of the weight arms. The hub member is aligned with and actuates the switch. The weighted levers respond to the centrifugal forces which rise as the speed of the motor increases. This results in the movement of the switching levers which establish a positive and fast movement of the hub or other switching device which moves relative to the switch. Generally, the force to create the disconnect movement must be somewhat greater than that to maintain the actuator in the run position. Reversely, on deceleration of the motor a return snap action should be created at a designed speed. Generally the cut-out speed and the cut-in speeds will be different. This difference is highly significant in order to conform the switching operation with the pull-up and full load characteristics as well as the break down performance characteristic of the motor.

The centrifugal actuator is required to operate each time the motor is started, slows down or stops. Sliding motions therefor are minimized within the mechanism to reduce wear and to maintain the desired operation. The switch and the interacting switch actuator desirably provides a movement which is not adversely affected over time by any wear characteristic between the switch and the moving part of the actuator. Structures which minimize sliding action and provides pivotal interaction between the parts with minimal wear interaction wherever possible is therefore desired.

Motors can be mounted both horizontally and vertically. A vertically mounted motor is subject to gravitational forces and may effect the operation of the switch actuator if there are significant differences in the hub and the actuating weight structure.

The cost and life of the parts are always of significance in connection with the normal high speed operation of AC motors. Additionally, the pivotal mounting of the weights requires special consideration with respect to maintaining the integrity of the actuator in the event of excessive speed which tend to cause the weights to actually disengage from the switching mechanism.

SUMMARY OF THE PRESENT INVENTION

The present invention is directed to a centrifugal actuator particularly adapted for induction AC motors and an actuator which can be constructed as a highly cost effective and reliable product. The actuator is precisely and firmly secured to the rotating shaft to avoid weight creep or deflection of the loaded portion of the actuator parts due to extreme forces as well as to further minimize sliding contact between the components and minimizing the load on sliding parts where sliding is required. Precise location of the centrifugal actuator to the shaft to establish and maintain the proper distance between the actuator and the switch as well as maintaining of the actuator in the preset position on the shaft and further preventing any rotation of the shaft is an important consideration. Securing the assembly together at all speeds is a significant requirement. In the present invention, the heavy metal weights are pivotally mounted within a special pivot unit of the centrifugal actuator which prevents the weights from coming off the actuator at speed beyond cut-out speed. The actuator is readily produced from known materials with known production processes to maintain a cost effective centrifugal actuator.

Generally in accordance with the present invention, the centrifugal actuator includes a base member which is firmly secured to the shaft and maintains a preset position. In the preferred construction, the base is firmly secured to the shaft to form a shoulder for the bearing on the adjacent end of the motor. The base of the actuator is secured to the shaft by formation of ribs within the base member to securely grip the shaft, and further is preferably formed with a connector secured to the shaft at one end of actuator to lock the actuator abutting the motor shaft bearing. This construction will automatically preset the proper distance between the actuator and a stationary control switch. The bearing interengagement maintains a clamping load on the actuator base which further minimizes any rotation of the centrifugal actuator on the shaft. In a preferred construction, a sliding hub includes a tubular portion which has a somewhat larger diameter than the base member and is mounted for axial movement thereon. An end flange on one end of the hub's tubular portion is aligned with the switch to actuate the same. Interconnecting recesses and guides support the sliding hub for axial movement on the base.

The weight members are pivotally secured to special pivot units on respective opposite sides of the base and are similarly pivotally mounted. Each weight is formed of an L-shaped configuration including an outer weight leg and a positioning portion including a pair of pivot levers projecting from the weight leg. Each weight further has an inwardly projecting pivot member which is fitted within a corresponding pivot unit on the base. The pivot unit includes a restricted opening permitting the assembly of the weight. The pivot levers of the pivot weights project inwardly to a pivotal connection within pivot bracket or units on the opposite side of the hub. At cut-out speed, the weights pivot arms in the pivot units and the lever pivots in the pivot brackets to move the hub and flange outwardly of the switch. The hub movement is terminated with the switch structure in open position and with the lever arms positively held with a reset moment position to prevent locking of the unit in the open position while further holding the weights locked within the pivot units.

A significant feature of the present invention is the pivoted mounting of the weights to the base member such that the weights are held in place under all conditions. In this aspect, the weights include a pivot rod secured within a hook-like member in the pivot unit of the base member. The rod and the hook-like member are formed with pivot components which pivot the rod in such an orientation as to positively prevent the pivot rod and, therefore, the weights from leaving the base member under all conditions.

The mounting of the hub with the guide members minimizes the sliding contact surfaces between the hub and the shaft. The more heavily loaded areas associated with the pivoted weight and the legs to the hub are essentially and primarily pivot actions rather than sliding actions. When areas of sliding is unavoidable, as between the motion of the hub on the base, the sliding surfaces are minimized as well as the loading therebetween.

The weights, hub and base are constructed such that the gravitational forces do not significantly influence the operation of the actuator. The result is obtained by positioning the pivot point of the weights at or near the center of the mass of the weights, giving due consideration to the mass of the hub.

Both the base and the hub are readily formed as molded plastic members with minimal sliding contact as a result of the construction and support therebetween. The interconnection between the weights and the hub are made essentially totally of pivotal motions therefor creating minimal wear as well as loading of the parts.

The tubular member of the base is preferably secured with the outer end abutting the bearing race by an outer suitable clamp unit positively securing thereof in axial position on the shaft. The clamp unit, in a preferred embodiment, includes a groove in the shaft and an encircling clamp member which positively supports the member in the desired engagement. Ribs on the inside of the base are formed outwardly into a loaded position upon the installation of the base to the shaft. This minimizes rotation of the base and maintains proper assembly for operation of the centrifugal actuator.

A hub member is also preferably slidably mounted on the base tubular member. The hub has an inner diameter slightly greater than that of the outer diameter of the tubular portion of the base. An interconnecting groove and guide member on the tubular portions support the hub for sliding motion on the base with limited surface interengagement.

The base and hub are readily and preferably formed of injection molded plastic. The parts are readily designed with sufficient flexibility to provide for hand attachment to the shaft and to each other to establish and maintaining a positive interconnection under all operating conditions, as well as speed above normal motor operating speed.

BRIEF DESCRIPTION OF THE DRAWINGS

The drawings illustrate a preferred construction incorporating an embodiment of the present invention.

In the drawings.

DESCRIPTION OF ILLUSTRATED EMBODIMENT

Figure 1:
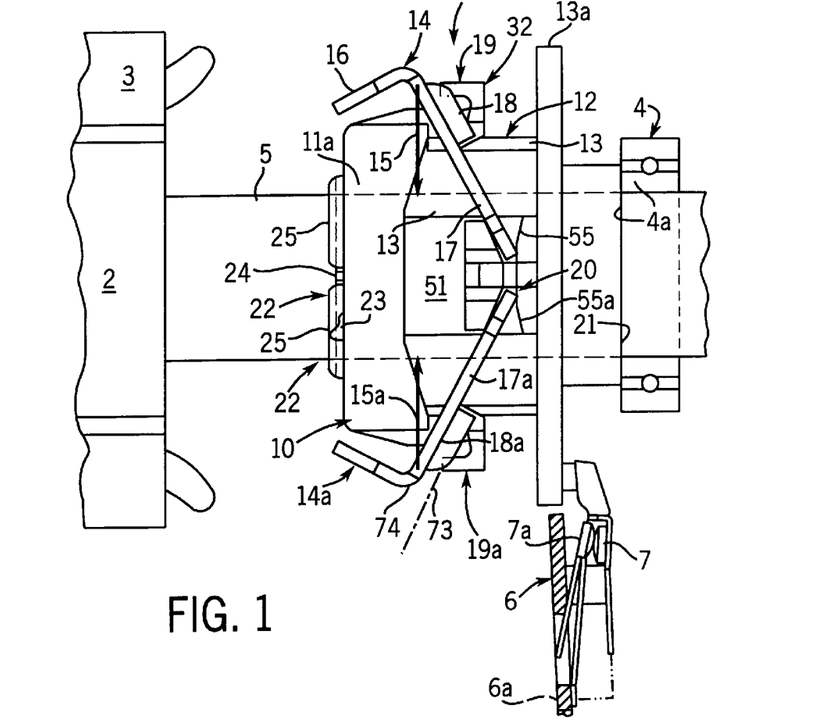
FIG. 1 is a side elevational view of a switch actuator connected to a motor shaft and shown in a rest position.

Referring to the drawings and particularly to FIG. 1, a fragmentary portion of a induction motor 1 such as a single phase induction motor, including a rotor 2 mounted within a stator 3 on a shaft 5, which is secured within the supporting frame-work by a bearing 4. A centrifugally actuated switch assembly or unit 6 is secured within the frame structure, not shown, on a mounting bracket 6a. The switch unit 6 includes contacts 7 and 7a connected into the winding circuit, not shown, and includes the fixed contact 7 fixed to the bracket 6a and the spring loaded contact 7a connected to the bracket 6a for selective engagement and disengagement with respect to the fixed contact 7. A spring-loaded switch arm 8 is secured to the movable contact 7a and depends downwardly towards the shaft 5. A centrifugal switch actuator unit 9 is coupled to the shaft 5 and rotates therewith. The switch unit 6 is connected in circuit with the start winding and/or start capacitor, not shown, of the stator and the switch is shown in FIG. 1 in the rest and closed position. The start winding and/or start capacitor, not shown, is connected in the circuit at the rest position, and at a pre-selected speed, the centrifugal actuator unit 9 moves to allow the contact 7a to move from the fixed contact 7 and disconnect the start winding, with the motor continuing to run on a run winding in accordance with well known constructions.

The present invention is particularly directed to centrifugal actuator 9 for mounting to the motor shaft 5 in a such an electric motor.

Figure 2:
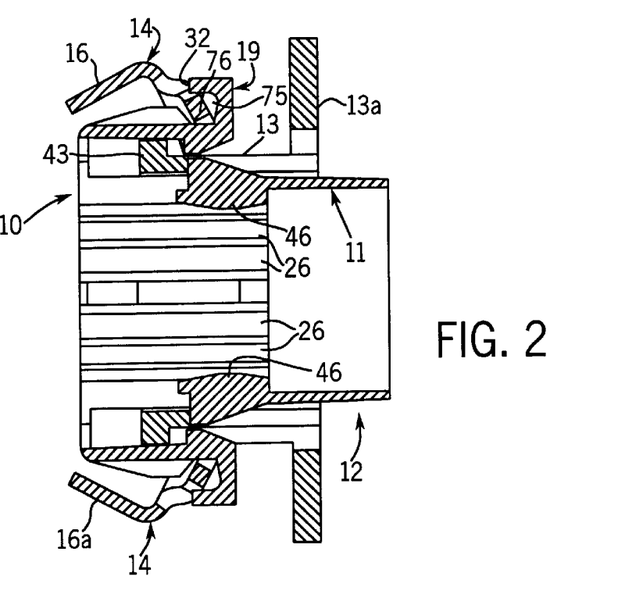
FIG. 2 is a vertical section through the actuator shown in FIG. 1 and in a central plane parallel to the paper.

Generally, in accordance with the present invention, centrifugal switch actuator 9 includes a base 10 having a tubular body 11 secured to and rotating with the shaft 5. The body 11 includes a head 11a at one end of the body 11. A hub 12 includes a tubular body or member 13 which is slidably mounted on the base tubular body 11 and includes a hub flange 13a which projects radially outwardly in aligned engagement with the switch arm 8 of the contact 7a as shown in FIG. 1. The base 10 and hub 12 are preferably formed of a suitable molded plastic which permits accurate formation of the several parts and elements thereof, as well as providing a strong and long life structure. A pair of like L-shaped weight members 14 and 14a are pivotally mounted on the outer end of head 11a of base 10, as shown in FIG. 1 and 2, and coupled to the hub 12 to move from the illustrated position of FIG. 1 to FIG. 2. Weight members 14 and 14a are located to opposite sides of the actuator and are interconnected by side springs 15 and 15a (shown diagrammatically in FIGS. 1 and 3) to bias the hub 12 to the switch closing position, as shown in FIG. 1.

Figure 11:
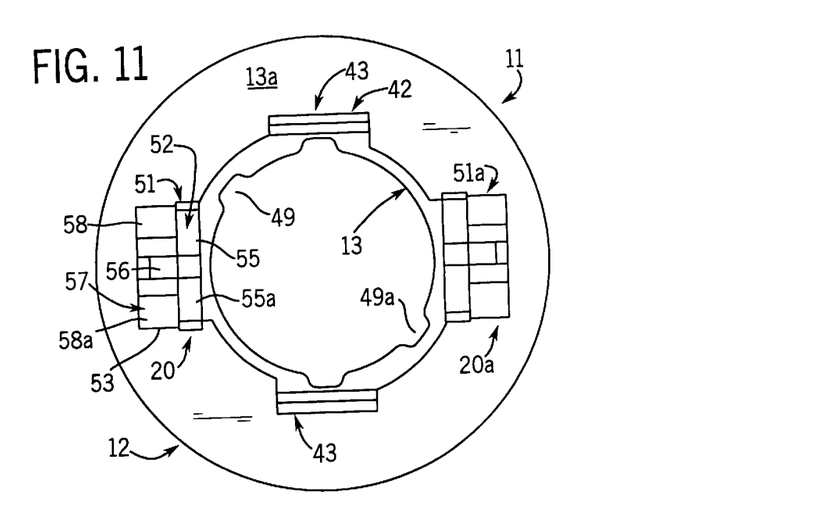
FIG. 11 is a view taken on line 11—11 of FIG. 5.

Each of the weight members 14 and 14a is similarly constructed as an L-shaped member. Referring to member 14, it consists of a first leg 16 shown as a substantial solid and flat plate member. Side levers 17 and 17a form a second leg of weight member and extend at a substantially right angle from the opposite ends of weight 16 and are specially connected thereto. A pivot arm 18, which forms a part of the second leg, is secured to the area of weight leg 16 between the levers 17 and 17a. The arm 18 is specially formed and pivotally mounted within a pivot bracket 19 (FIGS. 1–4) which forms a part of the head 11a of the base unit or member 10. The illustrated springs 15 and 15a on the opposite sides of the actuator unit 9 are coil springs. The ends of the springs 15 and 15a are coupled to the aligned side spring levers 17 and 17a of the weight members 14 and 14a. The springs 15–15a urge the weights to the position as shown in FIG. 1 to establish the start position with the motor at rest. The leg 16 of weight 14 extends outwardly over the head 11a with the arms 17 and 17a extending inwardly over the hub body 13 in the rest position of FIG. 1. The levers 17 and 17a are coupled to hub 12 by side opening or recess guides 20 and 20a (FIGS. 1, 3 and 11).

The application of power to the motor winding on stator 3 results in the rotation of the rotor 2, and the speed of the motor increases until a running speed is obtained or approached, at which time the weights 14 and 14a respond to the centrifugal forces on the weights to overcome the force of the springs 15–15a, and the weights move outwardly, with a snap action. The lever arms 17–17a pivot inwardly, and through the guides 20 and 20a on the hub 12, move the hub to the alternate position of FIGS. 3 and 4, which moves the contact arm 8 to provide rapid opening of the contacts 7–7a.

The motor 1 in accordance with well known construction, continues to run until the power is removed. Generally, the action of a centrifugal actuator in an induction motor is well known. The present invention is particularly directed to the construction of the components of the centrifugal actuator unit 9 to provide a more optimal and safe operation. The illustrated embodiment establishes a smooth movement of the hub 12 while the base unit 10 is constructed to maintain its position on the shaft, and creates an actuator which is reliable, has a long life and is cost effective. One significant feature of the invention resides in the pivotal connection between the weights 14–14a and the base 10 to prevent any disengagement of the weights from the base including at motor speeds beyond normal operating speeds.

Figure 3:
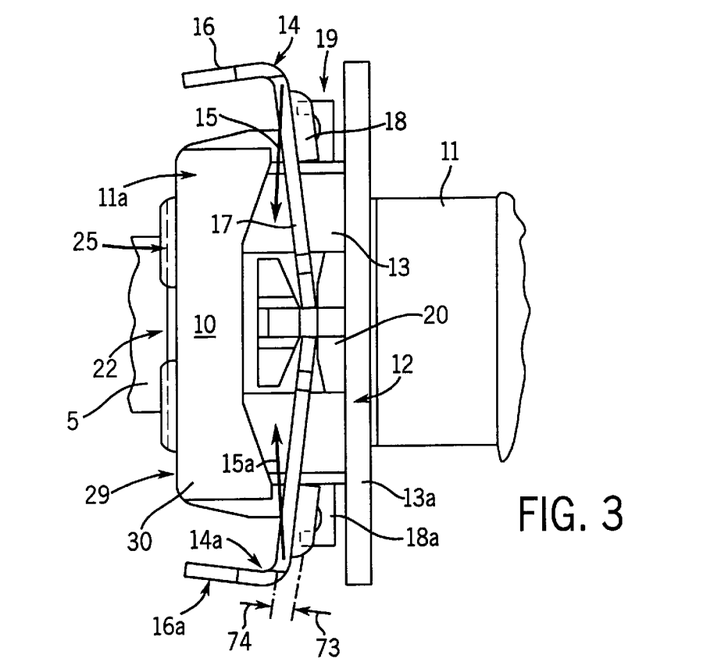
FIG. 3 is a side elevational view similar to FIG. 1 in a run position.

Thus, referring to FIG. 1–3, inclusive, the switch actuator base 10 is secured on the shaft 5 with a flat end face 21 abutting the race 4a of bearing 4. The body 11 is firmly secured to the shaft 5 with the flat end face 21 which is perpendicular to the motor axis and acts as a shoulder to hold the bearing 4 and motor in the proper position on the shaft 5. This arrangement also provides proper alignment of the actuator unit 9 and particularly the hub flange 13a with respect to the contact switch arm 8. The base 10 is firmly secured to the shaft 5 abutting the bearing race 4a by a shaft coupling 22. The shaft, as shown, includes a groove 23 precisely located with respect to the desired location of the outer face of the head 11a of tubular body 11. A lock ring 24 within the groove 23 abuts the head 12. The head includes outer radial tabs 25 extending outwardly over the periphery of the ring 24 to firmly hold it in location. Other systems may be used. For example, a shaft shoulder on the shaft rather than the groove and ring.

Figure 5:
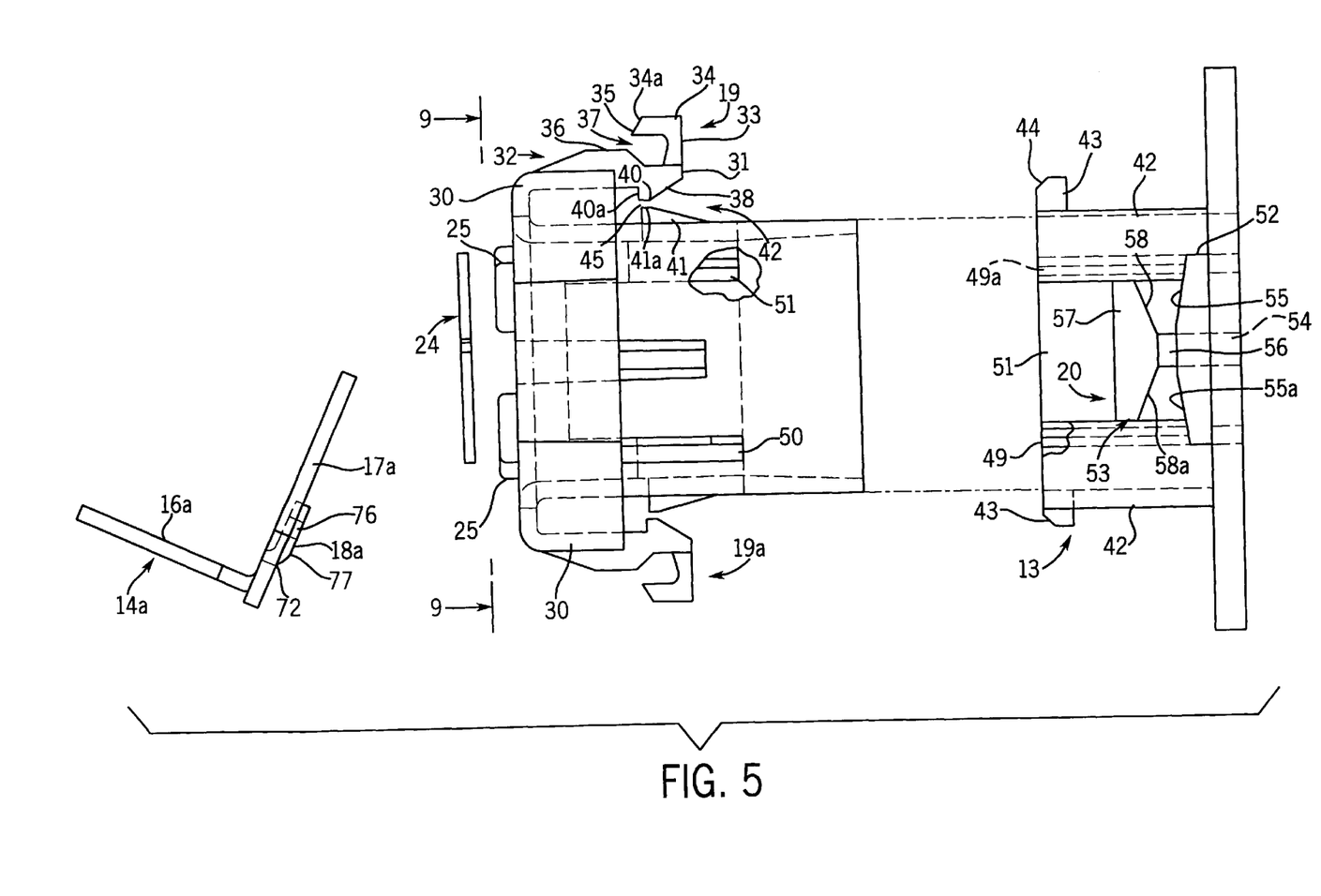
FIG. 5 is a side elevational exploded view of the elevations shown in FIG. 1.
Figure 6:
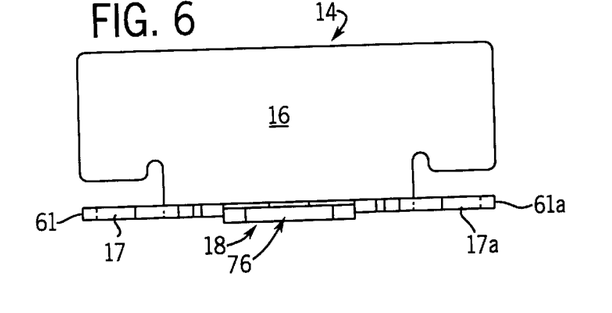
FIG. 6 is a plan view of a weight unit shown in FIGS. 1–5.
Figure 9:
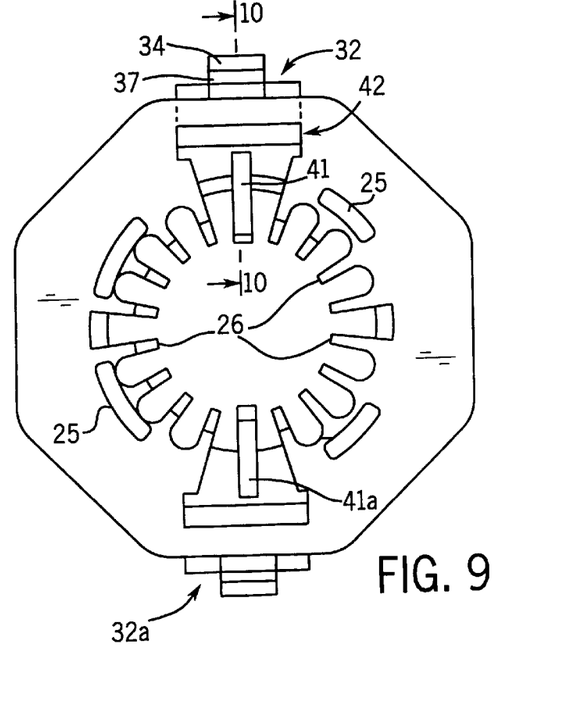
FIG. 9 is an end view of an element taken on line 9—9 of FIG. 5.
Figure 10:
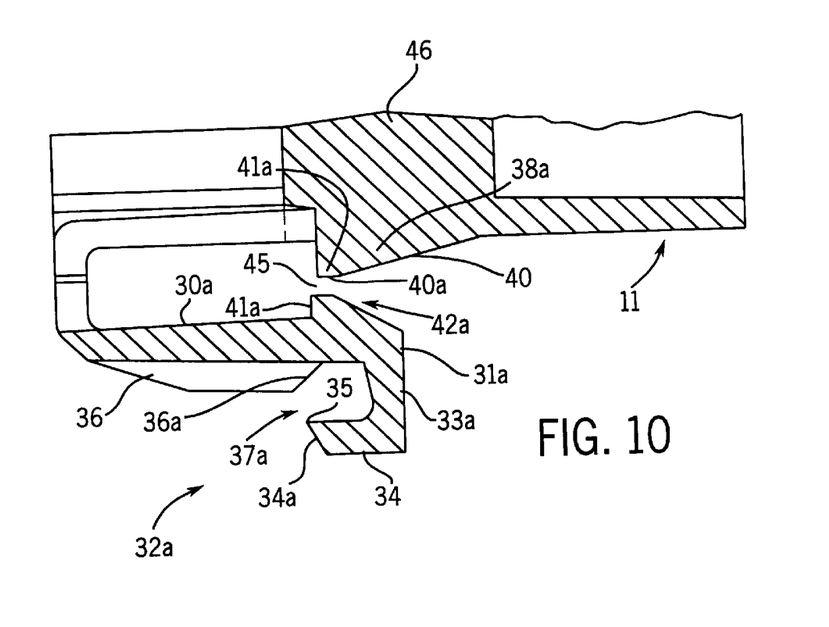
FIG. 10 is an enlarged partial sectional view taken on line 10—10 of FIG. 9.

In addition, as shown in the FIG. 2 which includes a vertical section through the base 10 and FIGS. 5 and 9, the outer or back half of the tubular body 11 includes internal projecting ribs 26. The ribs 26 are integral with the inner face of the tubular body 11 and extend through an outer section 27 shown generally over the outer half of the base 10. The ribs firmly secure the base 10 to the shaft 5 and holds the outer end face 21 abutting the bearing shoulder. The ribs 26 also contribute to minimizing any relative rotation of the base 10 on the shaft 5 to maintain the desired location of the assembly. The balance portion 28 of the tubular body 11 of the base 10, from the ribs 26 to the outer end face 21, is shown as a smooth surface spaced from the shaft 5 and aligning the outer edge or face 21 with the bearing race to function as a desired locating shoulder.

The base 10 is completed by the head 11a on the end of the body 11. Head 11a includes an outer radial flange or wall 29 projecting at right angles to the tubular body 11 and includes the locking ring and holding tabs 25 which engage and hold the locking ring in place. The head 11a is generally L-shaped and includes a hexagonal outer wall 30 extending back from wall 29 over the tubular body 11. The hinge or pivot bracket 19 and 19a for weights 14 and 14a are integrally formed with the outer wall 30 and appropriately support the weights 14 and 14a, as follows.

Referring particularly to FIGS. 1–4, 5 and 10, the pivot or hinge brackets 19 and 19a are identically constructed on the opposite sides of the head outer wall 30 and particularly on opposite parallel planer walls of the octagonal wall 30. The pivot bracket 19 and its coupling to weight 14 is described in detail, with the opposite pivot bracket 19a generally identified by corresponding numbers.

Referring particularly to FIGS. 3–6 inclusive, the pivot or hinge bracket 19 is integrally formed on the outer edge of the wall 30 to form a pivot hook assembly. The preferred construction includes a small plate 31 integral with the wall 30 and projecting outwardly therefrom. A hook 32 is completed by a somewhat narrower vertical L-shaped member consisting of a vertical wall 33 projecting upwardly from the plate 31 and a horizontal tab wall 34 projecting backwardly over plate 31, with the outer end 34a terminating somewhat short thereof. The outer end is tapered downwardly to an outer edge 35. The tab wall 34 is spaced above and in a plane parallel to the plate 31. A support rib 36 is secured to the top of the plate 31. The inner end of rib 36 extends over the plate 31 and is tapered inwardly as at 36a to define an inclined surface or taper which slants inwardly and downwardly in general spaced alignment with the outer edge 35 of the horizontal tab wall 34. Plate 31 and tab 34 define a controlled gap 37 into the hook 32 and provides a controlled introduction of weight member 14 and particularly arm 18 into the hook 32. The hook member 32 may be deflected slightly to insert the pivot arm 18 within the hook. This construction provides the proper hinge action for positive retention of the weight 14 within the hook 32 under all operating conditions including speeds beyond normal operating speed of the motor, as more fully developed hereinafter.

The underside of the hook plate 31 includes a depending rib or wall 38 extending downward as a plate enlargement. The rib 38 includes an inwardly tapered wall surface 40 terminating in a flat end surface 40a which is generally parallel to the plate 31.

The base body 11 includes an outer rib 41 aligned with the wall 38 and defining a restricted spacing beneath the hook 32. The rib 41 is tapered to a flat wall 41a aligned with the wall 40.

As shown in FIGS. 2, 4, 5 and 11, tubular body 13 of hub 12 slides over the tubular body 11 of the base 10. Diametrically located openings 42 extends from the flange 13a of the body 13 inwardly beyond the hinge or bracket unit 19 and terminates in an upstanding wall 43 at the inner end. The wall 43 has an upwardly tapered edge 44 at the outermost end aligned with the ribs 38 and 41 of the hook construction.

Figure 4:
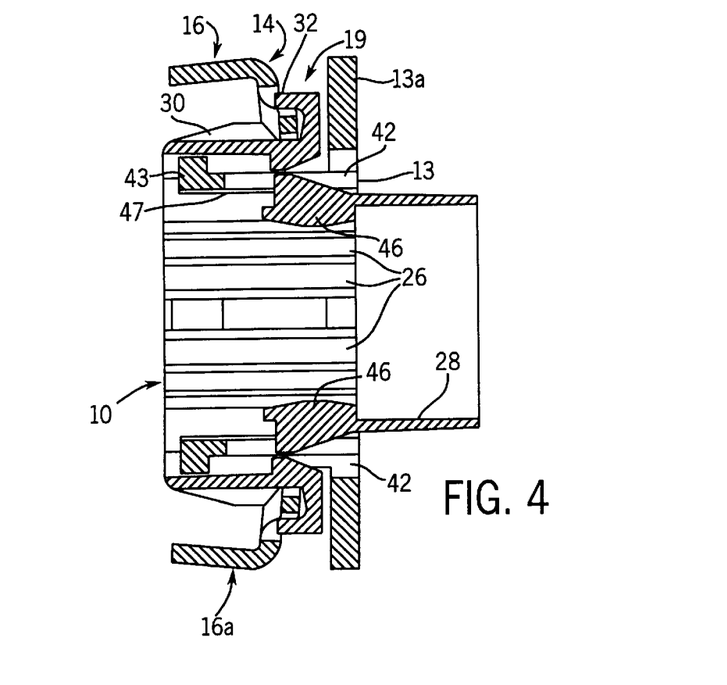
FIG. 4 is a vertical section similar to FIG. 2 through the actuator.

In the original assembled position of hub 12 and base 10, the ribs 38 and 41 are spaced slightly as at 45 (FIGS. 5 and 10), permitting limited deflection of the hook 32 relative to the hinge portion of the metal weight 14. The tapered surface of ribs 38 and 41 define a generally V-shaped opening for coupling the hub 12 to the base 10, and positioned to move the weight levers 17 and 17a within the guide units 20 and 20a on the opposite sides of the hub body 13. When assembled to the shaft 5, the base rib 41 has an inner projecting position 46, as shown in FIGS. 2, 4 and 5, which forces the rib 41 outwardly to operatively close the gap 45, shown in FIG. 5, and form a stop wall, as shown in FIGS. 2, 4 and 5, aligned with wall 43 of hub 13. More particularly, the hub 12 includes the tubular body 13 with an inner diameter just slightly larger than the outer diameter of the base 10, as shown at 47 in FIGS. 1–4. The hub 12 includes diametrically located inner grooves or recesses 49 and 49a (FIGS. 5 and 11) aligned diametrically and set at substantially 45° from the ends of the weight lever guide units 20 and 20a. The tubular body 11 of the base 10 includes externPal ribs 50 and 50a similarly located on the outer surface. Ribs 50–50a mate with the grooves 49 and 49a (FIG. 5) with proper alignment of the hub 12 on the tubular body 11 of the base 10. The hub 12 is then located with the pivotal diametric sides and the guide units 20 and 20a at 90° to the weight hinges or brackets 19 and 19a in the totally assembled position.

The tubular hub body includes the generally L-shaped opening 42 extending from the flange 13a towards the outer end and terminating at the outer end in an upstanding wall 43 at 90° to the guide units 20 and 20a (FIGS. 5 and 11). With the aligned connection of the hub 12 to the base 11, the wall 43 enters the V-shaped openings 45 defined by the aligned walls on the tubular body 11 of base 10. The hub 12 is forced into the V-shaped opening 45 deflecting the hook unit 32. As it moves through opening 45, the hook unit 32 snaps back into the normal position within the openings 42 and locks the hub 12 onto the tubular body 11 of the base 10. The hub tubular body 13 extending beyond the hook unit 32 is such that the hub 12 can move freely inwardly into a position where the back wall 43 of the hub 12 engages the inner wall of the head 11a of base 10 (FIG. 4) and outwardly with wall 43 at the hook 32 (FIG. 2). This controls the movement of the hub flange 13 and its operation in connection with the switch unit 6.

In a preferred construction, different bases are molded to fit different shaft diameters and/or to provide for proper switch location and/or bearing engagement.

The pivot lever guide units 20 and 20a are formed on opposite flat wall portion 51 and 51a of the tubular body 13 and the adjacent flange 13a of the hub, and in the assembled relation are at 90 degrees to the hooks 32 and 32a of the base 10.

Referring to lever guide unit 20, pivot locating members 52 and 53 are located and molded respectively into the back side of the flange 13a and a flat wall portion 51 of the body 13, respectively.

Member 52 defines a generally V-shaped unit integrally formed with the flange 13a and located slightly upwardly of the hub body 13 and wall portion 51, with a flange opening 54 beneath the member 52 (FIG. 5). The inner surfaces are tapered as at 55 with a centrally located flat connecting wall 56.

Member 53 is fixed to the flat wall position 51 and includes a centered vertical wall 57 which extends from the wall 56 downwardly to the flat wall portion 51. The member 53 includes oppositely tapering walls 58 and 58a from the wall 57 to the outer ends and define, with the tapered walls 55, a pair of oppositely extending V-shaped guide openings adjacent the flange 13a and flat wall 51 of hub 12. The outer ends of the levers 17 and 17a are located within such V-shaped guide openings.

Each of the L-shaped weight member 14 and 14a are like members as previously noted. The flat metal plate weight leg 16 of member 14 includes a central connecting portion 60 projecting outwardly of the end connection at substantially 90°. The leg or levers 17 and 17a extend from the opposite ends of the leg 16 with lateral end projections on the upper end of legs 15 and 15a form opposite end members extending outwardly of the plane of the legs. The hook members 61 and 61a at the lever receive round ends 63 and 63a of the coil springs 5 and 5a which bias the weights and levers to the rest position of FIG. 1.

The lever arm 17 and 17a are integrally formed extending outwardly from the bend connection 60 with slight taper on the inner edges to the outer ends which include a further inward projection 62 and 62a at the outermost end to form outer foot ends. The levers 17 and 17a are spaced from each other and define a central portion within which the hinge arm 18 is integrally formed.

Figures 7, 8:
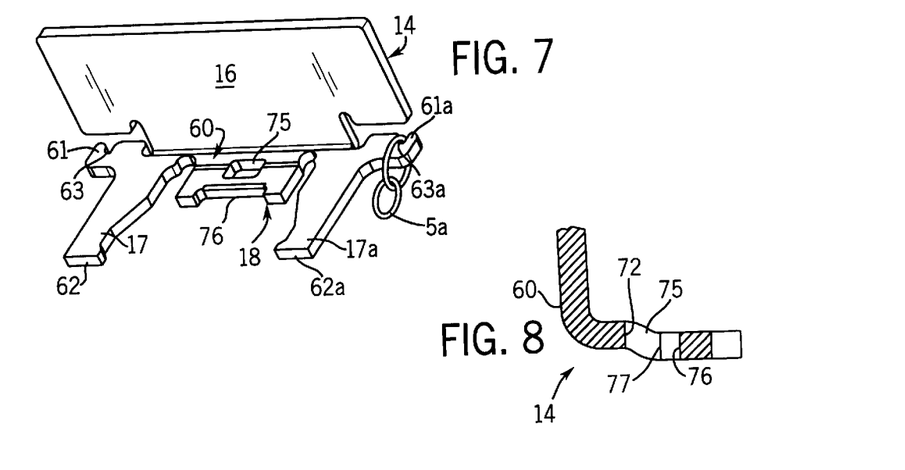
FIG. 7 is a pictorial view of the weight unit.
FIG. 8 is an enlarged fragmentary view of a part shown in FIGS. 6 and 7.

The hinge arm 18 is a plate member. As shown in FIG. 8, the arm 18 is specially bent outwardly as at 72 and 77 to locate the hinge plate in a plane 73 outwardly from the plane 74 of the levers 17 and 17a, as shown in FIGS. 1, 3 and 8. The hinge arm 18 has a central opening 75 between the sides thereof and located slightly inwardly from the connection to the weight member 16 to form an outer pivot rod 76 which is located within the hook 32. In particular, in one embodiment of the preferred construction, the plate 18 has a first portion bent away from the plane of the weight leg at 72 and a short distance outwardly a reversed similar bent angle as at 72 to locate the arm 18 and particularly rod 76 parallel to the original plane and spaced outwardly of the plane of the levers 17 and 17a.

The pivot rod 76 and the hook 32 are specially constructed such that the pivoting of the rod within the hook unit or bracket 19 locks the arm 18 relative to the hook opening to positively prevent the weight unit 14 separating from the hook unit 32 during the running of the motor, as shown in FIGS. 2 and 4. Further, the weights 14 and 14a in the run position include a reset moment, as shown in FIGS. 2 and 4 with levers 17 and 17a to the return side of center of the pivot lever in the guides 20, to ensure return of the weight 14 and 14a and the hub 12 to the rest position, i.e. preventing the assembly from a hang-up state in the rest position.

In the preferred embodiment, the hook 32 has the angled portion to the inner hook opening 37 which is formed with the flat inner axial wall having a width corresponding essentially to the width of the pivot offset rod 76. Referring to FIGS. 1 and 2, illustrating the rest position, the weight 14 is spring biased to the angled position holding the hub and flange 13 outwardly to engage and hold the switch 6 closed. The offset rod 76 of arm 18 is rectangular. The rod 76 is shown as a substantially square member. The edges of the rod are coined to eliminate sharp edges and provide a smooth pivoting movement of the weights 14 and 14a within the pivot brackets 19 and 19a of the base 10. This construction establishes a smooth pivot action with minimum wear on the pivoting components. The rod 76 has it axially outer edge 80 at the radially inner wall pivoted at pivot point 81 on the inner bottom notch of the hook. The rod 76 pivots on the coined edge within the pivot point 81 defined by the flat inclined and bottom walls 36 and 12 (FIG. 5) of the hook unit 32. The spring-loaded weight units 14 and 14a thus hold the hub 12 in the extended switch closing position.

In the run position, the centrifugal forces on the weight units 14 and 14a pivot the weight units on the pivot point 81 to the run position shown in FIGS. 3 and 4. The hub 12 is retracted and the switch 6 opens to disconnect the start winding and/or the start capacitor. In this position, the pivot arm 18 has its inner wall abutting the inner wall of the hook 32, as shown in FIG. 4. The abutting walls of the offset rod 76 of arm 18 and hook 32 establish an angled location of the outer spring-loaded levers 17–17a to the return side of the weight unit, resulting in the moment on the weight units 14 and 14a, as shown in FIGS. 2 and 4, which ensures that the assembly will not be "hung-up" in the run position when the motor speed drops to the cut-in position but moves to close the switch 6, and start the drive to the start position.

The illustrated embodiment discloses the preferred way of constructing the pivotal mounting of the weight units to insure the effective opening and closing the switch and through the pivotal construction at the pivotal support of the weights protecting against separation of the assembly.

In summary, the weight members 14 and 14a are assembled with the pivot arm 18 located within the hook 32. The weight members 14 and 14a extends backwardly over the head 11a of the base 10 and with the levers 17–17a extending laterally and downwardly into engagement with the corresponding tapered guide openings to the opposite side of the hub 12. The end or foot 71 of the lever 17 projects downwardly into the V-shaped opening created by the offset tapered surfaces of the members 52 and 53.

During the starting operation of the motor 1, the speed increases creating a centrifugal force on the weights 14–14a. At an appropriate running speed, the weights move outwardly as the forces expand the coil springs 15 and 15a and locate the assembly short of a center position, and creating a snap action movement of the weights outwardly to the run position of FIG. 2. The arm 18 pivots within the hook 32. This results in the arms 17 and 17a being retracted toward the head 11a and essentially locating the legs 17–17a just offset from a perpendicular direction with respect to the shaft 5 and parallel to the flange 13a of the hub 12, as shown in FIG. 2. The back wall of the hub 13 in alignment with the hook portion moves to engage the internal wall surface of the base head 11a to precisely locate the hub and the hub flange and thereby switch 6. The springs hold the weights 14 and 14a in the set run position until the speed of the motor decreases beyond a preset differential in accordance with conventional practice.

In the extended run position of FIG. 4, the back edge wall of the hub 12 engages the depending base wall 29 to define a precise location relative to the end of the base 10 and therefore a very precise location in relationship to the switch unit 6. This location is established and maintained as a result of the hub end acting as a shoulder for the motor bearing 4 and with the base unit 10 locked in location by the grooved interconnection 22 to the shaft 5.

The several openings provided in the hub 12 and the base 10 minimize the weight of the components and assist in moldability while providing the necessary interengagement of the cooperating parts formed on the base and the hub to guide these units in the operation and allow long system life.

The base and hub are preferably molded from a suitable plastic. A particularly satisfactory material for the forming of the hub and the includes the glass filled nylon.

The metal weights are preferably stamped and formed steel parts and the hinge portion should be carefully constructed. to avoid all burrs and maintain a desired weight arrangement to provide for an essentially snap action which produces a rapid movement of the hub, with a corresponding opening of the switch. An important factor of the preferred illustrated embodiments is the offset of the pivot leg or arm relative to the rest of the pivot plate. The offset from the alignment of the legs in one embodiment was approximately half the width of arm 18. This distance construction provided excellent locking of the weight members 14 and 14a within the hook members 32 and 32a of the base 10. The weight member must be retained on the hook members, even if the speed increases beyond the normal running speed. The special offset hinge rod with the hook portion having the limited access opening and with the interengagement of the hook hinge plate within the hook provides a very stable and reliable support of the switch actuator at normal as well as excessive running speed.

In accordance with a preferred construction of the present invention the base unit and the hub unit are formed with essentially similar weight factors. The weights with a horizontal mounting are not critical. In a vertically oriented motor however it is highly desirable that the weight member be related to each other in such a way that there is net minimal gravitational effect on the hub movement. In a preferred construction, the masses of the hub and the weights are roughly balanced such that the gravity forces are essentially negated. A most important feature in the system is the proper location of the pivot point of the weight units at substantially the center of the mass of each weight unit. With this view of the hub construction, gravitational forces do not significantly influence the operation of the actuator in either the horizontal or vertical position of the motor and actuator.

We claim:

1. A centrifugal actuator configured for mounting on a shaft rotatable between a rest position and a run position and actuating a switch, comprising a base member including a base tubular body configured for securement to the shaft and rotating therewith, a hub member having a hub tubular body slidably mounted on said base tubular body and having a switch control member to actuate said switch, first and second weight units located on diametric opposite sides of said tubular bodies and each having spaced levers coupled to said hub member for positioning said hub member on said base member, a weight pivot assembly including first and second pivot supports secured to said base member for supporting said first and second weight units and including complementing first and second pivot members, each one secured to said first and second weight units between said levers with said levers coupled to said hub, each said pivot member including a pivotal connector to the corresponding pivot support and pivoting thereon and moving said hub in response to the pivoting of the weight units, and said pivot supports and said corresponding pivot members including releasably engageable latch elements to mechanically secure said weight units to said pivot supports in the run position of shaft.

2. The actuator of claim 1 wherein said levers are located in a common plane on each said weight unit, each said pivot member is located in a plane offset from said common plane of said levers and establishes a reset moment on said levers with the weight unit in the run position.

3. The actuator of claim 2 wherein each pivot member includes a plate arm fixed between said levers, said plate arm having an opening and defining said pivot member on the outer end of said plate arm, each said pivot support includes a hook member having an opening receiving said pivot member and including an outer hook wall located within said opening and overlying said pivot member and locking said pivot member within the pivot support in the run position.

4. The actuator of claim 1 wherein said base tubular body includes a plurality of internal ribs circumferentially spaced within the body and defining the body opening, said opening constructed and configured to establish a tight engagement with the shaft to substantially provide relative rotation with respect to the shaft.

5. The actuator of claim 1 wherein said base tubular body is configured to firmly engage the shaft, said base tubular body having an end wall including a plurality of face tabs, a locating lock ring configured to be secured to the shaft and including tabs projecting into mating engagement with said face tabs to prevent rotation of the body relative to the shaft.

6. The actuator of claim 5 wherein said base tubular body includes internal ribs configured to firmly grip said shaft and extending throughout substantially one half of the tubular body and having the balance of the tubular body spaced from the shaft, said hub tubular body having an internal diameter greater than the outer diameter of the base, and the opposed walls of the base and hub having at least two complementary spaced and engaged sets of grooves and ribs on the opposed surfaces of the bodies to slidably support the hub tubular body on said base tubular body.

7. The actuator of claim 6 wherein the slidable support is limited to two sets of grooved ribs diametrically spaced and substantially located between the pivot supports and the lever coupling to said hub.

8. The actuator of claim 1 wherein said base member includes a stop member beneath the pivot support and an axially spaced stop member spaced in accordance with the movement of said hub between the rest position and run position, said hub tubular body having a stop wall at the axially inner end, said stop members and pivot support being arranged and constructed for entry of the stop wall between the base stop members and locating said stop wall between said stop members and thereby establishing the limits of hub movement.

9. The actuator of claim 1 wherein said weight members are located with a return moment in the run position.

10. The actuator of claim 1 wherein said hub includes pivot supports located on opposite sides of the hub with the lever ends located therein, each of said pivot supports including a flange and a first pair of spaced members on the flange in upwardly spaced relation to the hub tubular body and forming a generally V-shaped opening, a second pair of spaced members secured to the hub in spaced relation with the flange in accordance with the first spaced members and joined by a connecting wall to form with said first spaced members, a guide for the outer sides of the levers.

11. The actuator of claim 1 wherein said each weight unit includes a pivot point located substantially at the center of the mass of the weight unit.

12. The actuator of claim 1 wherein the shaft is a motor shaft with a bearing adjacent the actuator, said base tubular body having a flat end configured to engage said bearing and form a bearing shoulder, said shaft having means to secure the base abutting said bearing.

13. The actuator assembly of claim 1 for a motor having a motor bearing located in spaced relation to the switch, and wherein said tubular body of said base member has a head at one end and an outer end face opposite said head, said face being perpendicular to the axis of said tubular body, and said head being located at a fixed predetermined distance from said end face and configured to correspond to the location of the switch unit in the rest position relative to the motor bearing, and locating means for precisely securing said base member to said shaft with the end face secured in precise alignment with and configured to form a supporting shoulder for the motor bearing.

14. A centrifugal actuator for controlling the start switch of an electric motor having a shaft, comprising a base member including a base tubular body configured and constructed for securement to the motor shaft and rotating therewith, a hub member having a hub tubular body slidably mounted to a front portion of said base member and having a switch portion located to actuate the start switch, a weight assembly pivotally mounted to said base member and having lever means coupled to said hub tubular body for positioning said switch portion, means to releasable lock said weight assembly in the run position, and wherein said base tubular body includes a plurality of internal ribs extended from the back end to the front portion for approximately one-half thereof and constructed to firmly grasp the shaft.

15. The actuator of claim 14 wherein the head end of said base member includes location tabs, a locking member secured to said shaft and engaging said tabs to prevent creeping or deflecting of the base member in response to the switch force on the actuator.

16. A centrifugal actuator for controlling the start switch of an electric motor having a shaft, comprising a base member including a base tubular body configured and constructed for securement to the motor shaft and rotating therewith, a hub member having a hub tubular body slidably mounted to the front portion of said base member and having a switch portion located to actuate the start switch, a weight assembly pivotally mounted to said base member and having lever means coupled to said hub tubular body for positioning said switch portion, means to releasable lock said weight assembly in the run position, said base member having an opposite end surface perpendicular to the axis of said tubular body, and base securement means configured and constructed to be attached to said shaft and forming a locating support for the outer end of said base member, said securement means located relative to a motor bearing, whereby mounting of the actuator establishes a shoulder for said bearing.

17. A centrifugal actuator for controlling the start switch of an electric motor having a shaft, comprising a base member including a base tubular body configured and constructed for securement to the motor shaft and rotating therewith, a hub member having a hub tubular body slidably mounted to the front portion of said base member and having a switch portion located to actuate the start switch, a weight assembly pivotally mounted to said base member and having lever means coupled to said hub tubular body for positioning said switch portion, means to releasable lock said weight assembly in the run position, and said weight assembly is pivoted substantially at the center of the mass of the weight assembly.

18. The centrifugal actuator of claim 17 wherein said hub tubular body has an internal diameter greater than the outer diameter of said base member, and wherein said hub member is coupled to said base member by mating grooves and projections on the opposed surfaces therein.

* * * * *